United States Patent
Uland

(10) Patent No.: US 7,683,783 B2
(45) Date of Patent: Mar. 23, 2010

(54) BUSINESS PORTAL FOR ELECTRONICALLY TAGGING PRODUCT PACKAGING

(75) Inventor: David M. Uland, Granville, OH (US)

(73) Assignee: WS Packaging Group, Inc., Algoma, WI (US)

( * ) Notice: Subject to any disclaimer, the term of this patent is extended or adjusted under 35 U.S.C. 154(b) by 346 days.

(21) Appl. No.: 11/682,004

(22) Filed: Mar. 5, 2007

(65) Prior Publication Data
US 2007/0208456 A1   Sep. 6, 2007

Related U.S. Application Data

(60) Provisional application No. 60/767,133, filed on Mar. 6, 2006.

(51) Int. Cl.
G08B 13/14 (2006.01)
(52) U.S. Cl. .................. 340/572.1; 340/10.51; 700/115
(58) Field of Classification Search ............. 340/572.1, 340/572.8, 5.92, 10.51; 705/26, 28, 7; 235/385; 700/95, 115, 225; 156/64, 378
See application file for complete search history.

(56) References Cited

U.S. PATENT DOCUMENTS

| 6,123,796 | A | 9/2000 | Kathmann et al. |
| 6,994,262 | B1 | 2/2006 | Warther |
| 2002/0069096 | A1 | 6/2002 | Lindoerfer et al. |
| 2003/0023337 | A1 | 1/2003 | Godfrey et al. |
| 2003/0101238 | A1 | 5/2003 | Davison |
| 2004/0238098 | A1 | 12/2004 | Bleckmann et al. |
| 2005/0102057 | A1 | 5/2005 | Graushar et al. |
| 2005/0184872 | A1 | 8/2005 | Clare et al. |
| 2005/0219051 | A1 | 10/2005 | Nedblake |

OTHER PUBLICATIONS

Checkpoint Systems, Inc., EPC/RFID Compliance Services.
Piasecki, Dave. "RFID Update: The Basics, The Wal-Mart Mandate, EPC, Privacy Concern>s, and More." Feb. 20, 2006, INVENTORYOPS.COM, pp. 1-8. <http://www.inventoryops.com/RFIDupdate.htm>.
Lingle, Rick. RFID Editor, "RFID and corrugated box study", packworld.com, first published Jun. 2005<http://www.packworld.com/cds_print.html?rec_id=19500> Feb. 20, 2006.
International Search Report and Written Opinion for International Application No. PCT/US2007/063293 filed Mar. 5, 2006 by ISA/US.

*Primary Examiner*—Thomas J Mullen
(74) *Attorney, Agent, or Firm*—Stephen B. Salai, Esq.; Thomas B. Ryan, Patent Agent; Harter Secrest & Emery L.L.P.

(57) ABSTRACT

A system is provided in which electronic tags are pre-encoded and mounted on a continuous web for subsequent application to packaging at a packaging supplier plant. A B2B portal provides the information needed to coordinate the pre-encoding of the electronic tags with the packaging manufacture according to a goods packager's requirements.

32 Claims, 2 Drawing Sheets

BUSINESS PORTAL FOR ELECTRONICALLY TAGGING PRODUCT PACKAGING

CROSS-REFERENCE TO RELATED APPLICATIONS

This non-provisional application claims the prior benefits of U.S. Provisional Application No. 60/767,133 filed on Mar. 6, 2006, which is hereby incorporated by reference.

TECHNICAL FIELD

The invention relates to business and manufacturing systems for applying electronic tagging devices, particularly radio frequency identification tags, to product packaging, such as corrugated boxes.

BACKGROUND OF THE INVENTION

Some retailers and product distributors require goods packagers to tag the goods electronically by applying electronic tags to the packaging or the containers within which the goods are delivered. The electronic tags, which generally take the form of radio frequency identification tags (RFID tags), are encoded with numbers such as Serialized Global Trade Item Numbers (SGTIN) or other codes defined by a standards body that allow the goods to be tracked and inventoried by automatic or manual reading systems without further physical or visual contact with the tags or the packaging to which they are applied. Computer systems can store updatable information about the manufacture, conditions, and transport of the goods linked to the serial numbers.

For example, many retail goods are delivered in corrugated boxes having RFID tags applied to the boxes as way of identifying and communicating the contents of the boxes as well as the histories of the boxes and their contents from the time the contents are first made to the time the contents are emptied from the boxes. Typically, the RFID tags are encoded and applied to the corrugated boxes at the time the boxes are filled. Applicators for encoding and applying RFID tags to corrugated boxes can add considerable expense to individual product filling lines, especially since only a limited number of the orders filled by the lines may require RFID tagging. Problems with the application or encoding of the RFID tags can interrupt or slow the product filling lines, and unreadable or otherwise defective tags applied to the boxes require the affected boxes and tags to be discarded and replaced.

Some goods packagers require the manufacturers of corrugated boxes to supply the boxes with RFID tags already applied to the boxes. Similar difficulties can be encountered applying the RFID tags to boxes during their manufacture. Requirements for encoding, applying, and inspecting the RFID tags can slow production of the boxes and produce waste. High operating speeds of the box-making machines leave little time for inspecting the functionality of the tags, leading to a high rejection rate. Rejections after the tags are applied may require disposal or rework of the affected boxes as well as the tags. In addition, management of the electronic product codes among the functional tags applied to the boxes also involves difficulties and can require investments in expensive software.

Attempting to encode RFID tags after the tags are applied to boxes can be even more problematic because the required radio frequency (RF) field can be more difficult to accurately position with respect to the already mounted tags. The content of the boxes can also affect encoding operations. Lower electronic tag yields and more difficulties managing the encoded information are among the consequences.

SUMMARY OF THE INVENTION

The invention contributes a framework within which electronic tag suppliers, packaging suppliers, encoding service providers, and goods packagers can coordinate with each other for providing packaging having electronic tags encoded according to order. The assembly and encoding of the electronic tags can be carried out independently of the manufacture and filling of the packaging, lessening disruption of the latter high-speed processing stages. Electronic tag yields can be increased and manufacturing downtime and other waste can be reduced. Overall coordination among the various suppliers allows for optimization at each stage by providing real time status and schedule data within a common framework for fulfilling the packaging order.

For example, a common business-to-business (B2B) portal can be provided within which a goods packager can order a set of boxes associated with a set of electronic product codes (EPCs). The order can specify all of requirements for fulfilling the order, including specifying requirements, including suppliers, specifications, and quantities for electronic tags, encoding services, and the boxes, as well as the electronic product codes, due dates, delivery locations, and other details. The tag supplier and the encoder can cooperate to produce one or more reels of preencoded and inspected tags matching the set of electronic product codes ordered by the goods packager. The box supplier can feed the preencoded reel of tags into an inline tag applicator for producing the ordered quantity of boxes with the desired set of electronic product codes.

Demands on both goods packager and the packaging manufacturers (which are also generally the packaging suppliers to the goods packagers) are reduced with respect to prior methods that required more difficult electronic tag handling during high-speed operations needed for both producing and filling packaging efficiently. Encoding the electronic tags in a separate offline operation allows more time for encoding the tags as well as opportunities for re-encoding the same tags to meet encoding requirements. This reduces the number of electronic tags that must be scrapped and provides for the delivery of a stream of tags that can be encoded, sequentially or otherwise, with no missing or defective tags. The goods packagers and packaging manufacturers only need to read the tags, rather than encode them, which is much easier and consistent with both the requirements and benefits of dealing with electronically tagged goods.

Within a similar business-to-business model, responsibilities among the businesses, the locations of the businesses, and other relationships can be varied to accomplish similar overall business objectives. For example, the goods packager might defer to the box manufacturer regarding the choice of electronic tag supplier and encoder while providing overall specifications for the electronic tags along with a desired encoding sequence. The box supplier could order the electronic tags but perform the tag encoding function in-house. However, the encoding of the electronic tags is preferably accomplished in a separate operation that is completed in advance of an inline operation for applying the electronic tags to the boxes. The advance operation enables the electronic tags to be encoded and tested in batch or bulk order quantities, producing an uninterrupted sequence of pre-encoded and successfully tested electronic tags ready for application to boxes or other forms of packaging. An applicator is required to apply the tags to the boxes, and the applicator manufacturer could also be provided access to the business portal to assure that the applicator can accommodate the requirements of particular tags or boxes.

One version of the invention as a system for coordinating the application of encoded electronic tags to packaging for goods includes a network that communicates information for encoding the electronic tags and other information for associating the encoded electronic tags with the packaging for goods. A tag encoding system (a) draws the information from the network for encoding the electronic tags, (b) encodes the electronic tags in accordance with the encoding information, and (c) bundles a set of the encoded electronic tags. A tag applicator system (a) draws information from the network for associating the encoded electronic tags with the packaging for goods, (b) unbundles the encoded set of electronic tags, and (c) applies the encoded tags to the packaging in accordance with the associating information.

The tag encoding system can also include an inspection system that accepts or rejects individual electronic tags for addition to the bundled set of electronic tags. A sorter can be used to append accepted electronic tags without appending rejected electronic tags to the bundled set. The tag encoding system can be used to bundle the set of encoded electronic tags at least in part by (a) applying the accepted electronic tags in a sequence to a web and (b) winding the web together with the sequence of accepted electronic tags. Preferably, the tag encoding system encodes and tests batch order quantities of the electronic tags and bundles the electronic tags in an uninterrupted sequence of encoded and successfully tested electronic tags.

The tag applicator system can be arranged to unbundle the encoded set of electronic tags at least in part by unwinding the web of accepted electronic tags. The tag applicator system can be incorporated into a package manufacturing system so that the tags are applied to packages manufactured by the package manufacturing system.

The network can include a portal that coordinates separate operations for ordering packaging, encoding electronic tags, and applying the encoded electronic tags to the ordered packaging. For example, the network can be arranged (a) to communicate orders from a goods packager for both the packaging and the electronic tags associated with the packaging and (b) to communicate instructions from the goods packager for encoding the electronic tags. Alternatively, the network can be arranged to communicate orders from the packaging manufacturer for the electronic tags. Preferably, both a tag supplier and the packaging manufacturer are connected to the network for filling the orders.

Another version of the invention as a system of attaching encoded electronic tags to product packaging includes a network that communicates a sequence of codes for encoding electronic tags intended for application to the product packaging. An encoder encodes a succession of the electronic tags with the sequence of codes. A tester distinguishes successfully encoded electronic tags from unsuccessfully encoded tags. The encoder cooperates with the tester to encode successive electronic tags with the same code within the sequence of codes until a next of the successive electronic tags is successfully encoded. A sorter removes the successfully encoded electronic tags from the succession of electronic tags presented to the encoder and tester and applies the successfully encoded tags to a web that is advanced by a first in-line transporter at a first overall speed. The successfully encoded tags are applied to the web in a desired order, corresponding to the sequence of codes communicated by the network. A tag applicator receives the web of successfully encoded tags and applies the successfully encoded tags to the product packaging that is advanced by a second in-line transporter at a second higher speed.

The network can be arranged to accept orders for both the packaging and the electronic tags associated with the packaging. The tag applicator can access the network for associating the encoded tags with the product packaging. The network can also include a portal that coordinates operations of a goods packager, a packaging manufacturer, and a tag encoder. Through the portal, the goods packager can order the product packaging over the network and supply the sequence of codes for encoding the electronic tags intended for application to the product packaging. The packaging manufacturer can order the electronic tags over the network, and the tag encoder can access information about the sequence of codes through the network for encoding the electronic tags intended for application to product packaging.

The sorter is preferably formed within an asynchronous inserter that allows the advancing web to be relatively delayed, affording time for the unsuccessfully encoded tags to be diverted and the successfully encoded tags to arrive for application to the web. The first in-line transporter preferably includes a winder for winding the web together with the successfully encoded tags on a reel. The second in-line transporter preferably includes an unwinder for unwinding the web of successfully encoded tags.

Another version of the invention as a method of coordinating the application of encoded electronic tags to packaging for goods includes communicating information through a network about encoding the electronic tags and about associating the encoded electronic tags with the packaging for goods. Information is drawn from a network for encoding the electronic tags, and the electronic tags are encoded in accordance with the encoding information and bundled as a set. Information is also drawn from the network for associating the encoded electronic tags with the packaging for goods. The encoded set of electronic tags is unbundled and applied to the packaging for goods in accordance with the associating information.

Information can also be communicated through the network for placing orders for the electronic tags and the packaging for goods and supplying a sequence of codes for encoding the electronic tags intended for application to product packaging. The encoded electronic tags can be subject to an inspection for accepting or rejecting individual electronic tags for addition to the bundled set of electronic tags. Such bundling preferably includes appending the accepted electronic tags without appending rejected electronic tags to the bundled set, arranging the accepted electronic tags in a sequence along web, and winding the web together with the sequence of accepted electronic tags.

A goods packager, a packaging manufacturer, and a tag supplier are all preferably connected to the network. The network can communicate orders from a goods packager for the packaging along with instructions from the goods packager for encoding the electronic tags. The network can also communicate orders to the tag supplier for the electronic tags along with the instructions for encoding the electronic tags. The packaging manufacturer can pick up orders for the packaging over the network along with instructions for associating the encoded electronic tags with the packaging.

Yet another version of the invention as a method of attaching encoded electronic tags to product packaging includes electronically encoding and testing a plurality of electronic tags, segregating successfully encoded tags from not successfully encoded tags, and bundling the successfully encoded tags to the exclusion of the not successfully encoded tags. The bundled successfully encoded tags are delivered to a tag applicator, where the successfully encoded tags are unbundled and applied to product packaging.

The successfully encoded tags are preferably bundled in an order corresponding to a predetermined sequence of codes that are encoded into the electronic tags. Any individual code within the predetermined sequence that is unsuccessfully encoded into an electronic tag is re-encoded into a succeeding electronic tag before the succeeding electronic tag is bundled in the desired order. The successfully encoded tags can be applied to a web in the desired order. Following its delivery, the web can be unwound into the tag applicator.

BRIEF DESCRIPTION OF THE DRAWING FIGURES

DETAILED DESCRIPTION OF THE INVENTION

Figure 1:
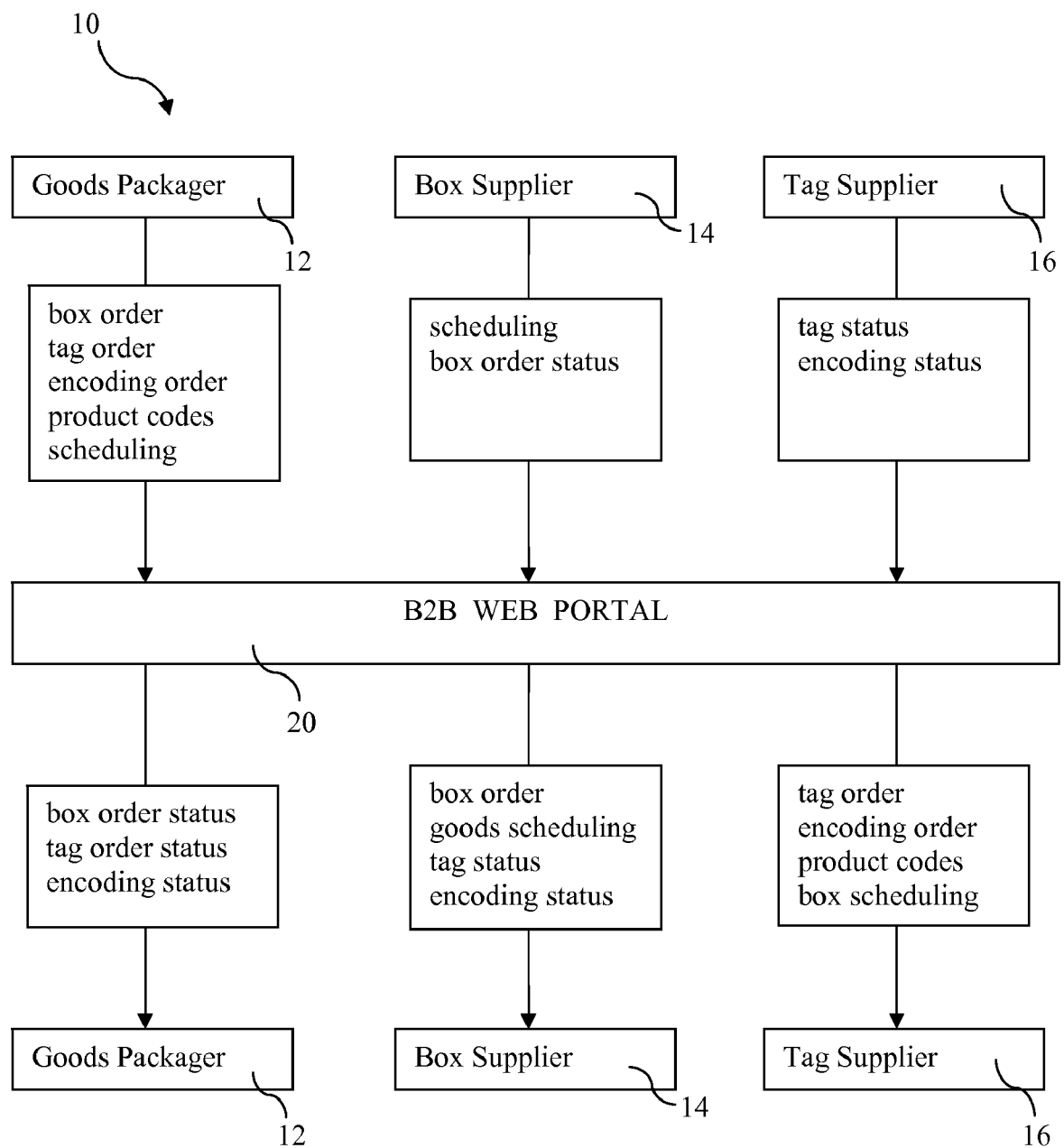
FIG. 1 is a diagram of a business-to-business model linking a goods packager, a box supplier, and an electronic tag supplier for coordinating the order, manufacture, and delivery of boxes with encoded electronic tags to the goods packager.

A business-to-business model 10 depicted in FIG. 1 links a goods packager 12, a box supplier 14, and a tag supplier 16 through a business-to-business web portal (B2B portal) 20. Although a B2B web portal is preferred, a virtual private network (VPN) or other data communication network could also be used to link the parties similarly.

The goods packager 12 through their link to the web portal 20 places an order for boxes having pre-encoded electronic tags. Specifications for both the boxes and the tags can be provided along with instructions for encoding the electronic tags. For example, product identification numbers in the form of stock keeping units and quantities or a file or other record of electronic product codes (EPCs) can be provided. Encoding a sequence of electronic product codes can be used to simplify the encoding requirements for bulk orders. Requirements specifying manufacturers, due dates, and other scheduling information can also be provided. The goods packager can monitor the status of their box order as well as details of its completion by monitoring other relevant communications to the portal 20.

The box supplier 14, who is linked to the same web portal 20, can receive information concerning the box order, specifications, and scheduling requirements. Due dates and other scheduling information for receiving the encoded electronic tags in coordination with the manufacture of the boxes can also be communicated through the portal 20. In addition, the box supplier can provide feedback regarding the processing and shipment status of the box order.

The tag supplier 16 can receive the orders for electronic tags and their encoding through the web portal 20, along with tag specifications, product codes, and scheduling information supplied by both the goods packager and the box supplier. Information concerning the progress and shipment status of the encoded electronic tags can be made available to both the goods packager and the box supplier though the portal 20.

The various functions and responsibilities of the interconnected parties can be organized in different ways. For example, the goods packager could choose its suppliers for not only the boxes but also for the electronic tags and their encoding. Different parties can be used for manufacturing and encoding the electronic tags. The assembly and encoding of the electronic tags can take place in a separate facility or within the same facility as the box manufacturing. However, the electronic tags are preferably supplied to inline box manufacturing systems as a reel or other sequence of pre-encoded and tested tags ready for application to boxes and later use identifying the individual boxes and their subsequent contents.

The pre-encoding is preferably more than an exercise for testing the electronic tags. Instead, the pre-encoding encodes a meaningful set of serial numbers or other database linkable indicia such as electronic product codes for eliminating a need to similarly encode the electronic tags after the boxes are made or filled. The linkable indicia can be read from the boxes for confirming shipment of the boxes to the goods packager and for recording the contents used to fill the boxes.

The B2B portal 20 is an example of a computer system that coordinates the assembly and encoding of electronic tags with the manufacture of packaging to fulfill requirements of a goods packager. Orders for both the encoded tags and the packaging can be made electronically, and job status and inventory reports can be returned electronically to fulfill packaging orders with minimal disruption despite requirements for applying electronic tags to the packaging. An enterprise portal available from a Dutch-based consultancy company, Webflex, can provide the necessary features for company log in, set up of the box and tag suppliers, stock keeping units, shipping and billing information, supply orders, and work queues for coordinating functions among the parties.

More than one goods packager, box supplier, and tag supplier can be made a part of the network or divisions of the network to provide more opportunities and choices. For example, a goods packager may choose to order boxes from different box suppliers while ordering electronic tags from the same supplier. Similarly, box manufacturers may desire connections for supplying more than one goods packager.

Figure 2:
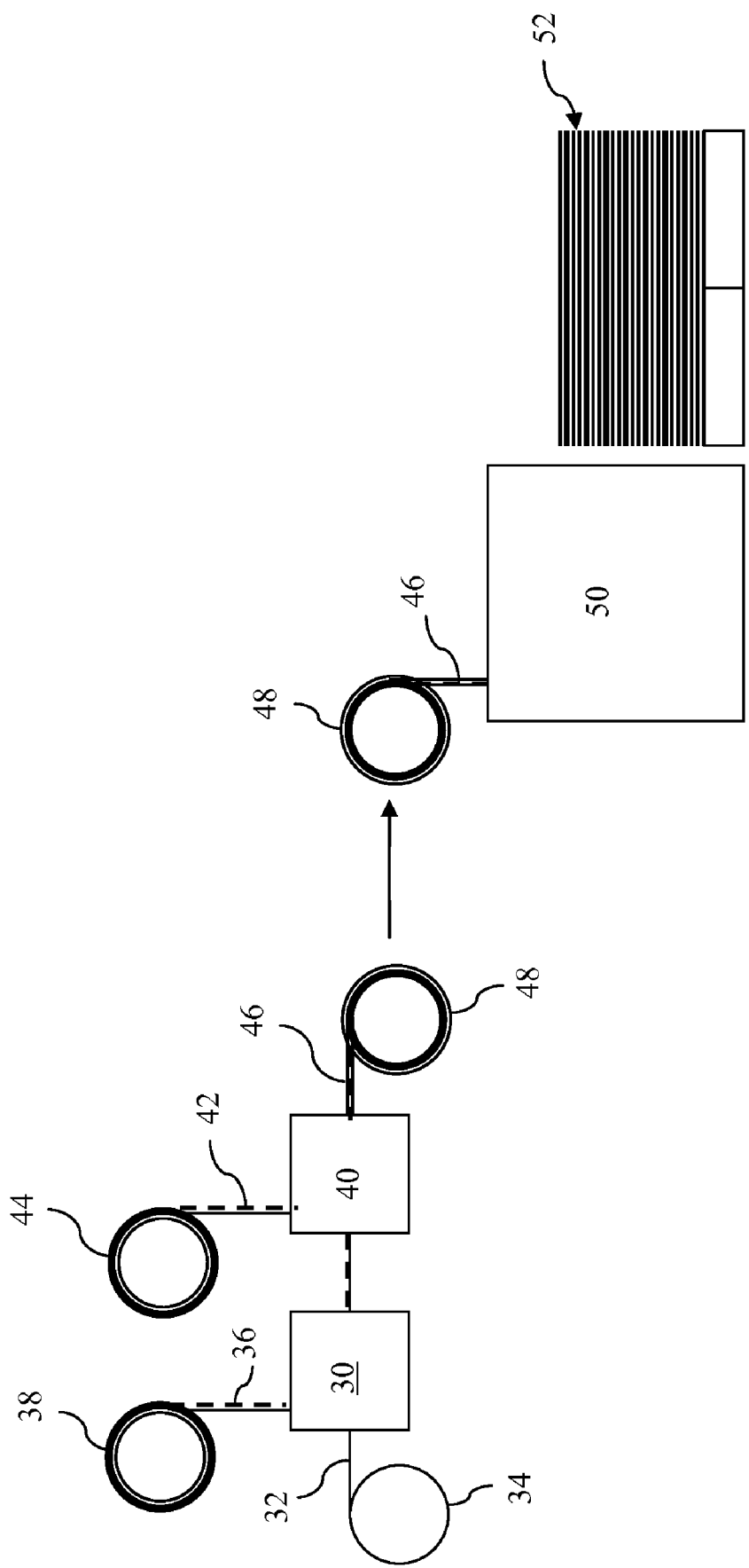
FIG. 2 is a diagram of an electronic tag assembler, tester, and encoder as well as an applicator for applying the encoded tags to a sequence of boxes.

FIG. 2 schematically depicts an asynchronous inserter 30 for assembling a series of encoded electronic tags along a carrier web 32 supplied from a carrier web reel 34. The asynchronous inserter 30 receives a supply of RFID inlets 36 from a reel 38, encodes the inlets 36, reads the inlets 36 for testing, and applies only the successfully encoded RFID inlets 36 to the carrier web 32. A label applicator 40 receives a supply of pressure-sensitive labels 42 from a reel 44 of the labels 42 and applies the labels 42 over the RFID inlets 36 to assemble a series of encoded electronic tags 46 along the carrier web 32, which is rewound as a reel 48 of encoded electronic tags 46. The asynchronous inserter 30 is associated with a transport system that allows the transport to wait for unsuccessfully encoded tags to be diverted and successfully encoded tags to arrive for inserting an uninterrupted sequence of successfully encoded tags. Apparatus for performing such asynchronous inserting functions is disclosed in co-owned U.S. Pat. No. 6,123,796 of Kathmann et al., which is hereby incorporated by reference.

The reel 48 of electronically encoded tags 46 is delivered to a box supplier having an applicator 50 for applying the encoded tags 46 to a succession of boxes 52. Although it would be possible to apply the encoded tags 46 at a number of different stages during the inline manufacture of the boxes 52, the applicator 50 is preferably incorporated in a box folder, die cutter, or stacker near completion of the boxes 52. The applicator could also, perhaps more preferably, be incorporated into an inline box stacker and restacker to further lessen the intrusion of the applicator 50 into the manufacture of the boxes.

The applicator 50 preferably operates for applying the encoded tags 46 to a succession of boxes 52 at an in-line speed commensurate with the speed of the box handling operation with which it is associated. The in-line speed at which the encoded tags 46 are applied to the boxes 52 can be considerably higher than the overall in-line speed at which the encoded tags 46 are encoded, tested, and assembled along the carrier web 32 so that the different operations can each be preformed with maximum efficiency and efficacy. Any RFID inlets 36 that are not successfully encoded can be segregated from the successfully encoded RFID inlets 36 without interrupting the box handling operations or causing the scrapping of packaging materials to which they could otherwise be applied. The controlled speed and environment of the encoding operations also provides a higher success rate of encoding the RFID inlets.

Although the invention has been described with more particularity with respect to the manufacture and application of electronic tags to boxes, the invention can be practiced with various other forms of packaging materials with similar beneficial results. Many other variations can be made to the actual implementation of this invention within the overall teaching of the invention, which will be readily apparent to those of skill in the art.

The invention claimed is:

1. A system that coordinates the application of encoded electronic tags to packaging for goods comprising
   a network that:
     communicates information for encoding the electronic tags, and
     communicates information for associating the encoded electronic tags with the packaging for goods;
   a tag encoding system that:
     draws the information from the network for encoding the electronic tags,
     encodes the electronic tags in accordance with the encoding information, tests the encoded tags,
     separates the successfully encoded tags, and
     bundles a set of the tested and successfully encoded electronic tags into a reel for delivering the set of tested and successfully encoded tags to a different location; and
   a tag applicator system at the different location that:
     draws information from the network for associating the encoded electronic tags with the packaging for goods,
     unbundles the set of tested and successfully encoded electronic tags from the reel, and
     applies the tested and successfully encoded encoded tags to the packaging for goods in accordance with the associating information.

2. The system of claim 1 in which the tag encoding system includes an inspection system that accepts or rejects individual electronic tags for addition to the bundled set of electronic tags.

3. The system of claim 2 in which the tag encoding system includes a sorter that appends accepted electronic tags without appending rejected electronic tags to the bundled set.

4. The system of claim 3 in which the tag encoding system bundles the set of encoded electronic tags into the reel at least in part by applying the accepted electronic tags in a sequence to a web and winding the web together with the sequence of accepted electronic tags.

5. The system of claim 4 in which the tag applicator system unbundles the encoded set of electronic tags from the reel at least in part by unwinding the web of accepted electronic tags.

6. The system of claim 1 in which the tag encoding system encodes and tests batch order quantities of the electronic tags and bundles the electronic tags in an uninterrupted sequence of encoded and successfully tested electronic tags.

7. The system of claim 6 in which the tag applicator system is incorporated into a package manufacturing system so that the tags are applied to packages manufactured by the package manufacturing system.

8. The system of claim 1 in which the network includes a portal that coordinates separate operations for ordering packaging, encoding electronic tags, and applying the encoded electronic tags to the ordered packaging.

9. The system of claim 8 in which the network communicates orders from a goods packager for both the packaging and the electronic tags associated with the packaging and also communicates instructions from the goods packager for encoding the electronic tags.

10. The system of claim 8 in which both a tag supplier and a packaging manufacturer are connected to the network for filling the orders.

11. The system of claim 8 in which the network communicates orders from the packaging manufacturer for the electronic tags.

12. A system of attaching encoded electronic tags to product packaging comprising:
   a network that communicates a sequence of codes for encoding electronic tags intended for application to the product packaging,
   an encoder that is presented with a succession of the electronic tags for encoding the tags with codes from the sequence of codes,
   a tester that distinguishes successfully encoded electronic tags from unsuccessfully encoded tags,
   the encoder cooperating with the tester to encode successive electronic tags with the same code within the sequence of codes until one of the encoded and tested electronic tags in the succession is successfully encoded,
   a sorter that removes successfully encoded electronic tags from the succession of electronic tags presented to the encoder and tester and applies the successfully encoded tags (a) to a web that is advanced by a first inline transporter at a first overall speed and (b) in a desired order along the web corresponding to the sequence of codes communicated by the network, and
   a tag applicator that receives the web of successfully encoded tags and applies the successfully encoded tags to the product packaging that is advanced by a second inline transporter at a second higher speed.

13. The system of claim 12 in which the network communicates orders for both the packaging and the electronic tags associated with the packaging and the tag applicator accesses the network for associating the encoded tags with the product packaging.

14. The system of claim 12 in which the network includes a portal that coordinates operations of a goods packager, a packaging manufacturer, and a tag encoder, and the goods packager orders the product packaging over the network and communicates over the network the sequence of codes for encoding the electronic tags intended for application to the product packaging.

15. The system of claim 14 in which the packaging manufacturer orders the electronic tags over the network, and the tag encoder accesses over the network information about the sequence of codes for encoding the electronic tags intended for application to product packaging.

16. The system of claim 12 in which the sorter is formed within an asynchronous inserter that allows the advancing web to be relatively delayed, affording time for the unsuccessfully encoded tags to be diverted and the successfully encoded tags to arrive for application to the web.

17. The system of claim 12 in which the first inline transporter includes a winder for winding the web together with the successfully encoded tags on a reel.

18. The system of claim 17 in which the second inline transporter includes an unwinder for unwinding the web of successfully encoded tags.

19. A method of coordinating the application of encoded electronic tags to packaging for goods comprising steps of communicating information through a network about encoding the electronic tags, communicating information through the network about associating the encoded electronic tags with the packaging for goods, drawing information from the network for encoding the electronic tags, encoding the electronic tags in accordance with the encoding information, reading the encoded electronic tags for accepting or rejecting individual electronic tags, applying accepted electronic tags without applying rejected electronic tags in a sequence to a web and winding the web together with the sequence of accepted electronic tags into a reel, drawing information from the network for associating the accepted electronic tags with the packaging for goods, unwinding the accepted electronic tags from the reel, and applying the accepted tags to the packaging for goods in accordance with the associating information.

20. The method of claim 19 in which the step of communicating information through the network about associating the encoded electronic tags with the packaging for goods includes placing orders for the electronic tags and the packaging for goods.

21. The method of claim 20 in which the step of communicating information includes communicating a sequence of codes for encoding the electronic tags intended for application to product packaging.

22. The method of claim 19 including a step of connecting a goods packager, a packaging manufacturer, and a tag supplier to the network.

23. The method of claim 22 in which the network communicates orders from a goods packager for the packaging and also communicates instructions from the goods packager for encoding the electronic tags.

24. The method of claim 23 in which the network communicates orders to the tag supplier for the electronic tags and also communicates to the tag supplier the instructions for encoding the electronic tags.

25. The method of claim 24 in which the network communicates orders to the packaging manufacturer for the packaging and also communicates information to the packaging manufacturer for associating the encoded electronic tags to the packaging.

26. A method of attaching encoded electronic tags to product packaging comprising steps of electronically encoding and testing a plurality of electronic tags, segregating successfully encoded tags from not successfully encoded tags, bundling the successfully encoded tags into a reel to the exclusion of the not successfully encoded tags, delivering the reel of bundled successfully encoded tags to a tag applicator, and unbundling the successfully encoded tags from the reel at the tag applicator and applying the successfully encoded tags to product packaging.

27. The method of claim 26 in which the step of bundling includes bundling the successfully encoded tags in a desired order corresponding to a predetermined sequence of codes that are encoded into the electronic tags.

28. The method of claim 27 in which an individual code within the predetermined sequence that is unsuccessfully encoded into an electronic tag is re-encoded into a succeeding electronic tag before the succeeding electronic tag is bundled in the desired order.

29. The method of claim 28 in which the step of bundling includes applying the successfully encoded tags to a web in the desired order.

30. The method of claim 29 in which the steps of unbundling and applying include unwinding the web into the tag applicator.

31. The method of claim 26 in which the steps of electronically encoding and testing include encoding successive electronic tags with the same code until one of the encoded and tested tags of the successive electronic tags is tested as being successfully encoded.

32. The method of claim 31 in which the step of bundling includes applying a succession of successfully encoded tags to an advancing web and winding the web together with the succession of successfully encoded tags applied to the web.

* * * * *